United States Patent
Planck

[19]

[11] Patent Number: 6,126,130

[45] Date of Patent: Oct. 3, 2000

[54] DEVICE FOR BRACING AND CENTERING TWO COMPONENTS

[75] Inventor: Wolfgang Planck, Rüsselsheim, Germany

[73] Assignee: Mannesmann VDO AG, Frankfurt am Main, Germany

[21] Appl. No.: 09/204,786

[22] Filed: Dec. 3, 1998

[30] Foreign Application Priority Data

Dec. 4, 1997 [DE] Germany ............................ 197 53 781

[51] Int. Cl.$^7$ .................................................. A47G 1/10
[52] U.S. Cl. ........................ 248/316.3; 248/565; 411/353
[58] Field of Search ................... 248/560, 565, 248/580, 316.3, 316.7; 403/13; 411/352, 353, 517, 530

[56] References Cited

U.S. PATENT DOCUMENTS

| | | | |
|---|---|---|---|
| 3,180,388 | 4/1965 | Newcomer, Jr. et al. | 411/353 |
| 3,437,119 | 4/1969 | Dey | 411/353 X |
| 5,395,194 | 3/1995 | Johnson et al. | 411/353 |
| 5,544,992 | 8/1996 | Ciobanu et al. | 411/353 |
| 5,681,060 | 10/1997 | Berg et al. | 411/353 X |

*Primary Examiner*—Ramon O. Ramirez
*Attorney, Agent, or Firm*—Mayer, Brown & Platt

[57] ABSTRACT

A device for bracing two components has a spring ring (10) which is designed to be corrugated in each case in the radial and the axial direction. The spring ring (10) can be compressed axially or radially, without, in each case, losing its spring effect in the other direction. It is particularly advantageous for the spring ring (10) to be used for bracing a fuel pump (4) of an automobile in a feed unit (1).

18 Claims, 2 Drawing Sheets

DEVICE FOR BRACING AND CENTERING TWO COMPONENTS

FIELD OF THE INVENTION

The invention relates to a device for bracing and centering two components, with a spring ring having regions designed to be resilient in the axial direction and the centering elements for aligning the components in the radial direction. The invention relates, furthermore, to two advantageous uses of the device.

The devices have, for example, a cup spring or a corrugated spring as a spring ring and are known in practice. The spring ring serves, as a rule, for generating a constant prestressing force between the components. The centering elements are usually fastened to one of the components and, in each case, are supported on the other component. However, such centering elements are complicated to manufacture.

BACKGROUND OF THE INVENTION

There has already been the idea of using an elastomeric ring for prestressing and centering the components. However, such an elastomeric ring has only a very small spring excursion, so that the prestressing force depends to a very great extent on the tolerances of the components. Furthermore, the elastomeric ring loses its spring effect, for example in the radial direction, when it is compressed in the axial direction. In addition to the elastomeric ring, therefore, a corrugated ring is usually provided, which generates the necessary axial prestress between the two components, irrespective of the radial prestress forces.

The problem on which the invention is based is to design a device of the type initially mentioned, in such a way that it can be produced particularly cost-effectively and is simple to assemble. Furthermore, two advantageous uses of the device according to the invention are to be provided.

The first-mentioned problem is solved, according to the invention, by designing the centering elements as regions of the spring ring which are resilient radially inward and/or outward, the radially and the axially resilient regions being capable of being moved virtually independently of one another.

By virtue of this design, the spring ring can be compressed radially, without losing its spring effect in the axial direction. The device according to the invention, having the spring ring, therefore requires a single part which prestresses and, at the same time, centers the components relative to one another. As a result, the device according to the invention is a particularly cost-effective design and can be assembled in a simple way. The spring ring can for example, be of round, oval or such like design so as to correspond to the shape of the components. Furthermore, the spring ring can be severed at one point, in order to push it over one of the components from the side.

As a rule, the spring ring is inserted into a recess of one of the components. In this case, the second component projects with a reduction in cross section into the recess.

The radially resilient regions of the spring ring could, for example, extend over the entire height of the spring ring. However, since reductions in cross sections and recesses often have, at their ends, radii caused by manufacture, the radially resilient regions would be supported on the radii and, in the most unfavorable case tilt the spring ring. According to another advantageous development of the invention, tilting of the spring ring can be avoided in a simple way if the regions designed resiliently in the radial direction are arranged approximately halfway up the height of the spring ring. In this case, the radially resilient regions are supported at a point which is distant from the radii of the components. Furthermore, by virtue of this design, the axially resilient regions are likewise kept at a distance from the radii arranged at the end of the reduction in cross section and the recess.

The spring ring could be designed, for example, as a corrugated ring having radially projecting spring tongues. However, according to another advantageous development of the invention, the spring ring is particularly cost-effective if it is designed to be corrugated in the radial direction. The necessary prestressing forces of the device according to the invention in the radial and axial directions can be set in a simple way by an appropriate choice of the cross section of the spring ring. For this purpose, the spring ring may, for example, have a round or polygonal cross section.

SUMMARY OF THE INVENTION

The contribution to a further reduction in the costs of the device according to the invention is made if the spring ring is manufactured from plastic. The spring ring can thereby be produced, for example, by the injection molding method, this being particularly cost-effective especially in the case of large quantities.

By means of the device according to the invention, particularly high prestressing forces can be generated if the spring ring is manufactured from spring steel.

According to another advantageous development of the invention, corrosion of the spring steel of the spring ring can be avoided in a simple way if the spring steel has a covering made of plastic.

By means of the device according to the invention, the components can be secured against rotating in a simple way, if the spring ring has elevations intended for penetrating into recesses of the components. Furthermore, the position of the components in relation to one another can be fixed by means of an asymmetric arrangement of the elevations. The elevations thus serve, in addition, as an assembly aid.

The second-mentioned problem, namely to provide an advantageous use for the device, is solved, according to the invention, by using the device for bracing a fuel pump of an automobile in a feed unit.

The feed unit consists, as a rule, of a bowl-like housing lower part and of a housing cover interlocked with the upper edge. By virtue of the invention, the fuel pump no longer has to be braced between the housing lower part and the housing cover of the feed unit by means of an elastomeric ring and, in addition, a corrugated ring. The feed unit and the fuel pump can therefore have particularly large tolerances, without an undesirable prestressing force having to be expected between these components. Furthermore, the fuel pump can be secured against rotation in a simple way by means of the elevations arranged on the spring ring. The fuel pump is mounted in a particularly simple and therefore also very cost-effective way. In this use of the device according to the invention, moreover, the spring ring decouples the structure-borne noise of the fuel pump. Vibrations of the fuel pump are therefore not transmitted to the feed unit.

Another advantageous use of the device according to the invention is the retention of sensors or actuators on fixed components of an automobile.

By virtue of the invention, such sensors or actuators no longer have to be screwed tight or are held by a clamping socket. The spring ring, provided with elevations, can retain the sensors or actuators automatically and keep vibrations away from the sensor or actuator.

DESCRIPTION OF THE DRAWINGS

Numerous embodiments of the invention are possible. To make its basic principle even clearer, several of these are illustrated in the drawing and are described below. In the drawing.

DETAILED DESCRIPTION OF THE PREFERRED EMBODIMENT

Figure 1:
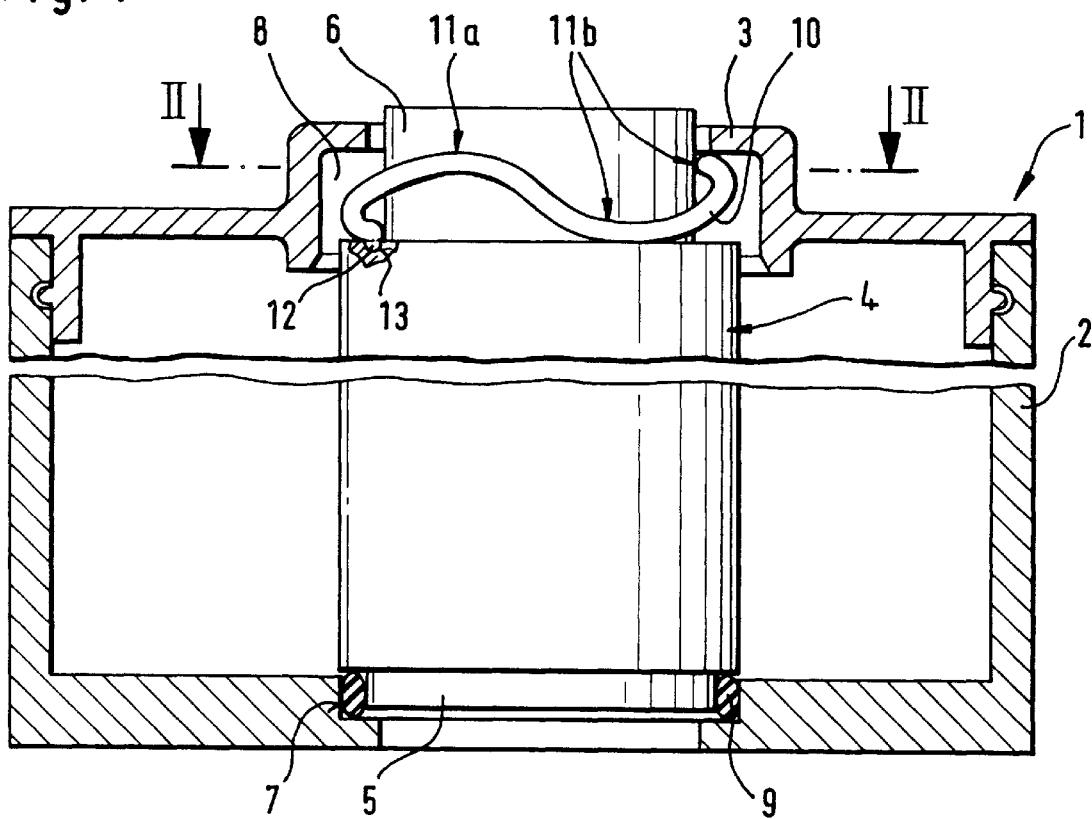
FIG. 1 shows a sectional illustration through a feed unit having a fuel pump prestressed by a device according to the invention.

FIG. 1 shows diagrammatically a feed unit 1 with a bowl-like housing lower part 2 and with a housing cover 3 interlocked in the housing lower part 2. A fuel pump 4 is arranged in the feed unit 1. The fuel pump 4 has, in its upper and lower end respectively, a reduction in cross section 5, 6 which in each case project into recesses 7, 8 of the feed unit 1. An elastomeric ring 9, which serves for decoupling the structure-borne noise of the fuel pump 4, is arranged in the lower recess 7. Arranged in the upper recess 8 is a spring ring 10 which is corrugated in the axial direction and which prestresses the fuel pump 4 downwardly. The spring ring 10, in its corrugated shape, has regions 11a, 11b which are resilient in the axial direction. A knoblike elevation 12 is arranged in one of its regions bearing on the fuel pump 4. The elevation 12 penetrates into a recess 13 of the fuel pump 4 and secures the latter against rotation. The spring ring 10 likewise decouples the structure-borne noise of the fuel pump 4. A second spring ring, not illustrated, may, of course, also be used instead of the elastomeric ring 9.

Figure 2:
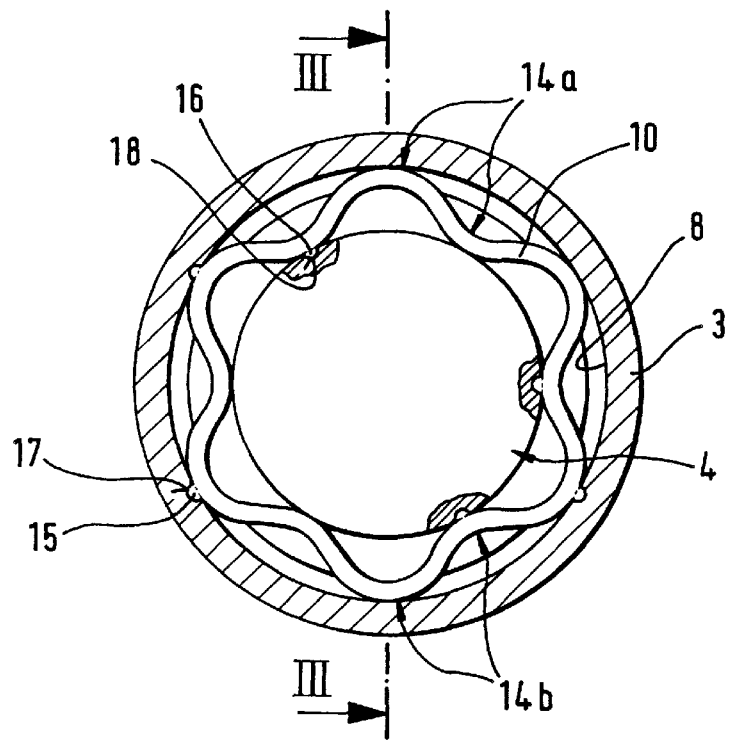
FIG. 2 shows the feed unit with a spring ring in a sectional illustration along the line II—II from FIG. 1.

FIG. 2 shows, in a sectional illustration along the line II—II from FIG. 1, that the spring ring 10 is also designed to be corrugated in the radial direction. As a result, the spring ring 10 also has regions 14a, 14b resilient in the radial direction and centers the fuel pump 4 in the recess 8 of the housing cover 3 of the feed unit 1. Furthermore, the spring ring 10 has elevations 15, 16 which are arranged in its radial inner and outer regions which are distributed asymmetrically over its circumference. These elevations 15, 16 penetrate into recesses 17, 18 of the fuel pump 4 and of the feed unit 1. The fuel pump 4 can therefore be mounted in the feed unit 1 in only a single position.

Figure 3:
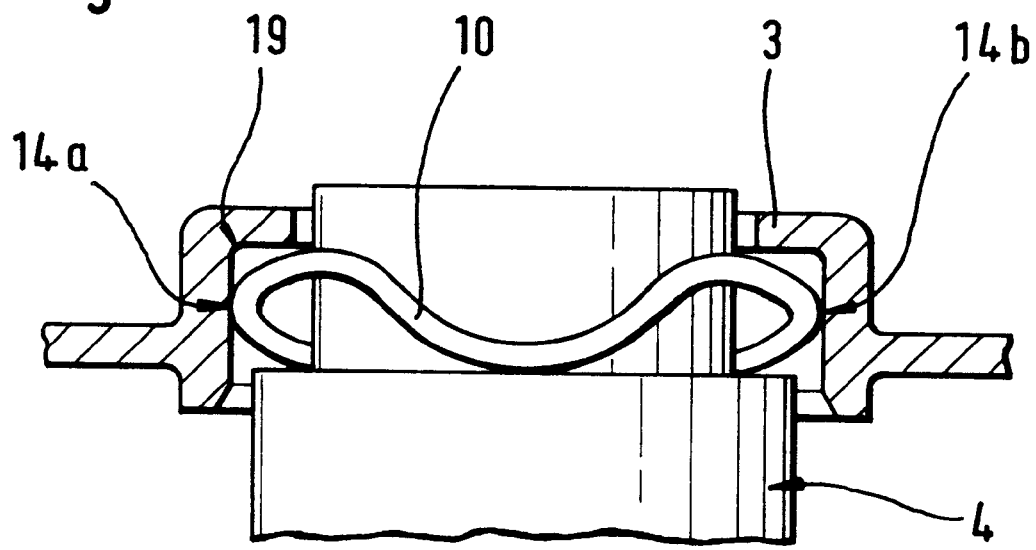
FIG. 3 shows the feed unit from FIG. 2 in a sectional illustration along the line III—III.

FIG. 3 shows the feed unit 1 from FIG. 2 in a sectional illustration along the line III—III. In this case, it can be seen that the radially resilient regions 14a, 14b, which bear on the housing cover 3 of the feed unit 1, are arranged approximately halfway up the height of the spring ring 10. This prevents the spring ring 10 from tilting on a radius 19 which is present at the end of the recess of the housing cover and which is caused by manufacture.

What is claimed is:

1. A device for bracing and centering two components comprising: a spring ring having axially resilient regions and centering elements which align the components in the radial direction, wherein the centering elements have radially resilient regions, and the radially and axially resilient regions are capable of being moved independently of one another.

2. The device as claimed in claim 1, wherein the radially resilient regions.

3. The device as claimed in claim 2, wherein the radially resilient regions are corrugated in the radial direction.

4. The device as claimed in claim 3, wherein the spring ring is manufactured from plastic.

5. The device as claimed in claim 3, wherein the spring ring is manufactured from spring steel.

6. The device as claimed in claim 5, wherein the spring ring has a covering made of plastic.

7. The device as claimed in claim 1, wherein in the spring ring has elevations for penetrating into recesses of the components.

8. The device as claimed in claim 1, wherein the components are a fuel pump of an automobile in a feed unit.

9. The device as claimed in claim 1, wherein the components are sensors or actuators on fixed components of an automobile.

10. The device as claimed in claim 1 wherein the axially resilient regions are corrugated in the axial direction.

11. The device as claimed in claim 1 wherein the spring ring comprises a closed and endless loop.

12. The device as claimed in claim 1 wherein the spring ring is severed at a point on the ring for inserting the ring over one of the components in the radial direction.

13. A device for bracing and centering two components comprising: a spring ring having axially resilient regions and centering elements which align the components in the radial direction, wherein the centering elements have radially resilient regions, the radially resilient regions are capable of being moved independently of one another, and the radially resilient regions are arranged approximately halfway up the height of the spring ring.

14. The device as claimed in claim 13, wherein the radially resilient regions are corrugated in the radial direction.

15. The device as claimed in claim 14, wherein the spring ring is manufactured from plastic.

16. The device as claimed in claim 14, wherein the spring ring is manufactured from spring steel.

17. The device as claimed in claim 16, wherein the spring ring has a covering made of plastic.

18. The device as claimed in claim 13, wherein in the spring ring has elevations for penetrating into recesses of the components.

* * * * *